United States Patent
Yu et al.

(10) Patent No.: US 11,537,598 B1
(45) Date of Patent: Dec. 27, 2022

(54) EFFECTIVE ENSEMBLE MODEL PREDICTION SYSTEM

(71) Applicant: International Business Machines Corporation, Armonk, NY (US)

(72) Inventors: Dong Hai Yu, Xian (CN); Song Bo, Xian (CN); Jun Wang, Xian (CN); Jiang Bo Kang, Xian (CN); Yao Dong Liu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/400,159

(22) Filed: Aug. 12, 2021

(51) Int. Cl.
*G06F 16/23* (2019.01)
*G06F 16/28* (2019.01)

(52) U.S. Cl.
CPC ........ *G06F 16/2379* (2019.01); *G06F 16/285* (2019.01)

(58) Field of Classification Search
CPC .......................... G06F 16/2379; G06F 16/285
See application file for complete search history.

(56) References Cited

U.S. PATENT DOCUMENTS

| | | | | |
|---|---|---|---|---|
| 2009/0024551 A1* | 1/2009 | Agrawal | .................. | G06N 5/02 707/999.1 |
| 2014/0317046 A1* | 10/2014 | Benke | .................. | G06F 16/254 707/602 |
| 2016/0071017 A1 | 3/2016 | Adjaoute | | |
| 2016/0295020 A1* | 10/2016 | Shaffer | ............... | H04M 3/5235 |
| 2017/0262781 A1* | 9/2017 | Yang | ................ | G06Q 10/06393 |
| 2017/0329881 A1 | 11/2017 | Korada | | |
| 2018/0174164 A1* | 6/2018 | B | ........................... | G06N 5/025 |
| 2019/0236155 A1* | 8/2019 | Bachrach | ............ | G06F 16/3329 |
| 2019/0303475 A1* | 10/2019 | Jindal | .................... | G06N 5/003 |
| 2019/0340518 A1* | 11/2019 | Merrill | .................. | G06N 20/00 |
| 2020/0252682 A1 | 8/2020 | Walker | | |
| 2021/0375392 A1* | 12/2021 | Polcari | .................. | G16H 50/70 |
| 2022/0027986 A1* | 1/2022 | Hesami | .................. | G06N 20/20 |

OTHER PUBLICATIONS

Disclosed Anonymously, et al., "A Method for the Generation of Large Synthetic Test Datasets Based on Cluster Models, and Using Database Views as the Generation Mechanism", An IP.com Prior Art Database Technical Disclosure, IP.com No. IPCOM000238143D, Aug. 5, 2014, 4 pgs.

* cited by examiner

*Primary Examiner* — Huawen A Peng
(74) *Attorney, Agent, or Firm* — David B. Woycechowsky

(57) ABSTRACT

A method for instantiating a first specific model, as one record, based on a model scoring template, clustering a plurality of models into a plurality of groups to obtain a plurality of clusters, computing a model contribution weight value for the given cluster, choosing a set of top model(s) from the plurality of models, and updating the model(s) of the set of top model(s) dynamically.

15 Claims, 4 Drawing Sheets

EFFECTIVE ENSEMBLE MODEL PREDICTION SYSTEM

BACKGROUND

The present invention relates generally to the field of recovery models, prediction systems and also to the field of personalized print markup language.

The Wikipedia entry for "data recovery" (as of May 17, 2021) states as follows: "In computing, data recovery is a process of salvaging (retrieving) inaccessible, lost, corrupted, damaged or formatted data from secondary storage, removable media or files, when the data stored in them cannot be accessed in a usual way. The data is most often salvaged from storage media such as internal or external hard disk drives (HDDs), solid-state drives (SSDs), USB flash drives, magnetic tapes, CDs, DVDs, RAID subsystems, and other electronic devices. Recovery may be required due to physical damage to the storage devices or logical damage to the file system that prevents it from being mounted by the host operating system (OS). The most common data recovery scenario involves an operating system failure, malfunction of a storage device, logical failure of storage devices, accidental damage or deletion, etc. (typically, on a single-drive, single-partition, single-OS system), in which case the ultimate goal is simply to copy all important files from the damaged media to another new drive." (footnotes omitted)

As the term is defined for purposes of this document, "models" shall mean training models used in the context of machine learning algorithms that are developed and applied on and through computers.

The concept of training models is discussed as follows in the Wikipedia entry for "machine learning" (as of 26 Jul. 2021): "Training models[.] Usually, machine learning models require a lot of data in order for them to perform well. Usually, when training a machine learning model, one needs to collect a large, representative sample of data from a training set. Data from the training set can be as varied as a corpus of text, a collection of images, and data collected from individual users of a service. Overfitting is something to watch out for when training a machine learning model. Trained models derived from biased data can result in skewed or undesired predictions. Algorithmic bias is a potential result from data not fully prepared for training. Federated learning . . . Federated learning is an adapted form of distributed artificial intelligence to training machine learning models that decentralizes the training process, allowing for users' privacy to be maintained by not needing to send their data to a centralized server. This also increases efficiency by decentralizing the training process to many devices. For example, Gboard uses federated machine learning to train search query prediction models on users' mobile phones without having to send individual searches back to Google." (footnote(s) omitted)

Some machine learning (ML) algorithms, and their associated training models, are used to provide the machine logic for powering prediction systems, which are computer systems programmed to make predictions about anything, such as the manner in which events will play out in the future in the real world in various contexts. Prediction systems, including machine learning and its associated training models, have conventionally been used to predict in factual contexts, such as the following factual contexts: who will win an election, how will a pandemic spread over the globe, prediction of financial markets, financial credit rating predictions, real estate markets, supermarket sales prediction, unwanted email detection for unread emails and forecast the revenue of a product.

The definition of "ensemble model" will now be discussed. Ensemble models are created by "ensemble methods," which are techniques that create multiple models and then combines them to produce improved results. The known technique of "federated learning" uses multiple training models, similar to ensemble models. The use of multiple training models usually produces more accurate solutions than a single model would, such as ensemble methods (Random trees, XGBoost or LightGBM, etc.) which are widely used in business. Ensemble models, such as the ones implemented in these kinds of computer systems, are usually very large and contain thousands of base models.

SUMMARY

According to an aspect of the present invention, there is a method, computer program product and/or system that performs the following operations (not necessarily in the following order): (i) instantiating a first specific model, as one record, based on a model scoring template; (ii) clustering a plurality of models into a plurality of groups to obtain a plurality of clusters; (iii) for each given cluster of the plurality of clusters, computing a model contribution weight value for the given cluster; (iv) choosing a set of top model(s) from the plurality of models; and (v) updating the model(s) of the set of top model(s) dynamically.

DETAILED DESCRIPTION

Figure 1:
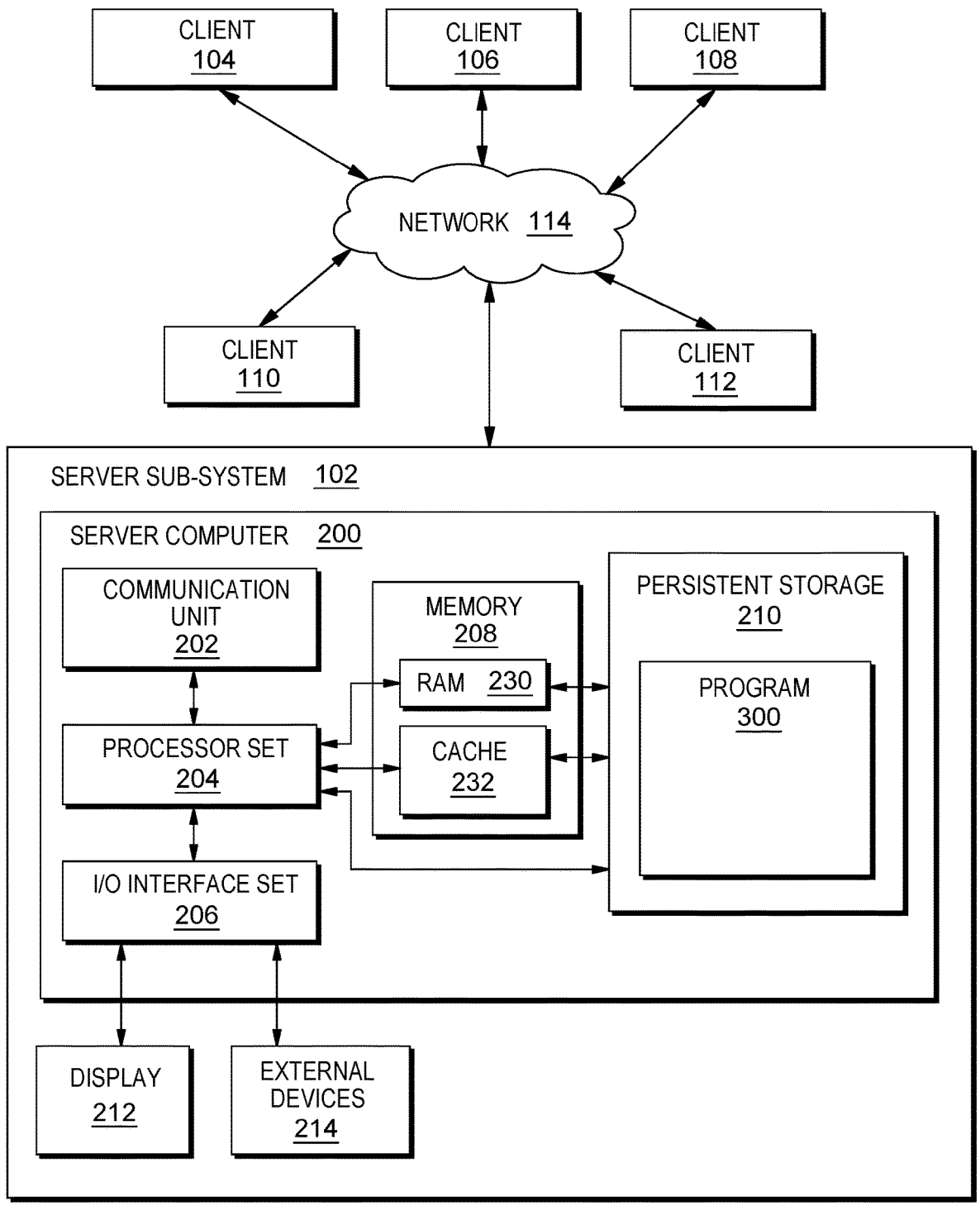
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
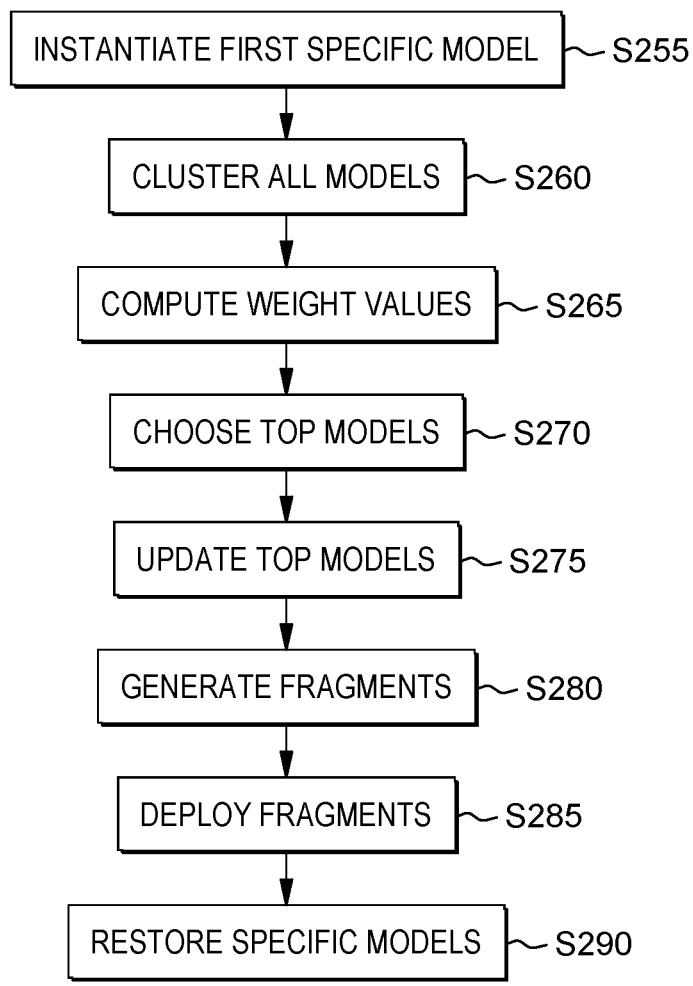
FIG. 2 is a flowchart showing a first embodiment method performed, at least in part, by the first embodiment system.
Figure 3:
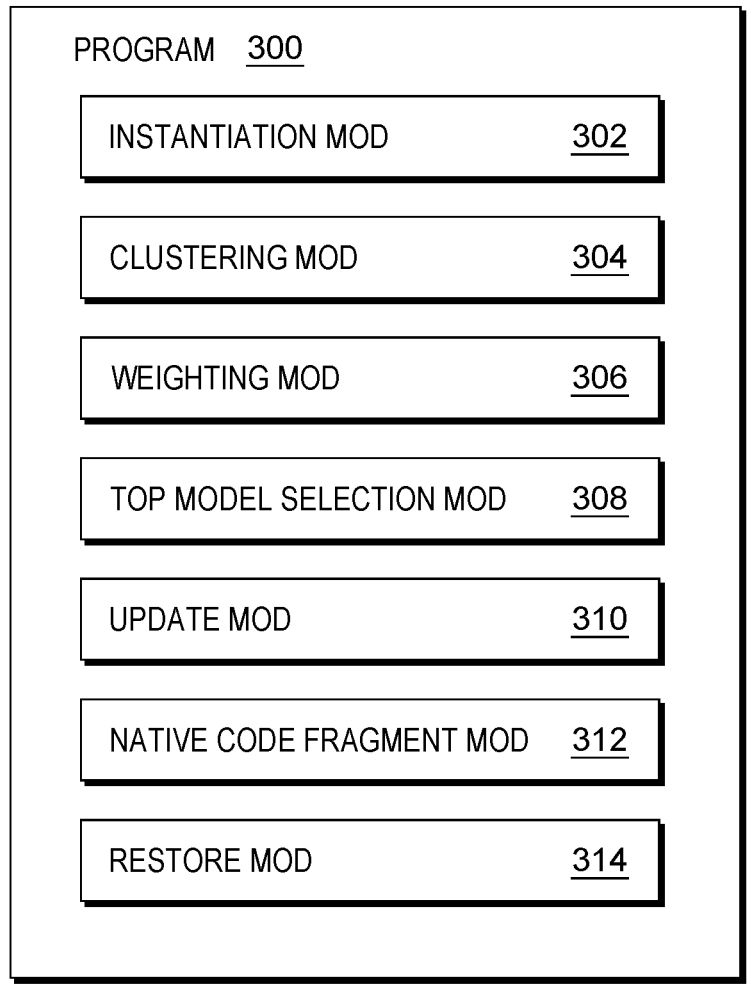
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where instantiation module ("mod") 302 instantiates a first specific model as one record, based on a model scoring template, which will generate based on PMML (personalized print markup language). Alternatively, languages and/or protocols other than PMML may be used.

Processing proceeds to operation S260, where clustering mod 304 clusters all models into multiple groups (sometimes herein referred to as a "plurality of groups"). The resulting clusters are sometimes herein referred to as a "plurality of clusters".

Processing proceeds to operation S265, where weighting mod 306 computes model contribution weight values for each cluster of the plurality of clusters.

Processing proceeds to operation S270, where top model selection mod 308 chooses a set of top model(s) from the plurality of models.

Processing proceeds to operation S275, where update mod 310 updates the top models dynamically.

Processing proceeds to operation S280, where native code fragment mod 312 generates native code fragment packages of different platforms based on user settings and the first specific model and its associated one record.

Processing proceeds to operation S285, where mod 312 deploys the native code fragment package to the specific real time scoring environment (in this example, client subsystem 104) based on a platform setting and users settings.

Processing proceeds to operation S290, where restore mod 314 restores specific models to products (for example, PMML, python, etc.), based on a specific record in the database.

The concept of a recovery model will now be discussed. When the model is lost, the origin data and configuration may not be found or the system will spend a lot of time to retrain it. Then the data and configuration can be recovered based on a process. This process is based on predicted value data and a model template, and there is no need to retrain the model.

Some embodiments of the present invention may include one, or more, of the following operations: (i) set digger regression model parameters based on workflow; (ii) generate the scoring template based on the previous operation; (iii) when the model is lost, get the predicted value (and their input data); (iv) compute model coefficients (for example: a*x1+b*x2+c*x3+d*x4 . . . +intercept=y; compute and get the a, b, c, d . . . intercept); and/or (v) take these values to the template and generate the model. Computer code related to one, or more, of the foregoing operations will now be set forth:
</FactorList>
<PPMatrix>
    <PPCell parameterName="P0000002" predictorName="Drug_transformed" value="0"/>
    <PPCell parameterName="P0000003" predictorName="Drug_transformed" value="1"/>
    <PPCell parameterName="P0000004" predictorName="Drug_transformed" value="2"/>
</PPMatrix>
    <ParamMatrix>
    <PCell beta="43.7142857142857" df="1" parameterName= "P0000001"/>
    <PCell beta="-7.84472049689441" df="1" parameter Name="P0000002"/>
    <PCell beta="18.7857142857143" df="1" parameter Name="P0000003"/>
    <PCell beta="0" df="0" parameterName="P0000004"/>
</ParamMatrix>

III. FURTHER COMMENTS AND/OR EMBODIMENTS

Some embodiments of the present invention recognize the following facts, potential problems and/or potential areas for improvement with respect to the current state of the art: (i) with the increasing demand for prediction accuracy, more and more advanced analysis techniques have been developed, for example, the ensemble method; (ii) the ensemble tree is usually very large and contains thousands of base models (for example, an ensemble tree from customers can have up to more than 2000 decision trees, and the size of the model file is more than 4 gigabytes); (iii) complicated analysis is bound to introduce a more computationally intensive workload; (iv) a predictive model becomes more complicated, that is, the big model needs more time for inference, while in many areas, the response time is critical for the real-time inference, for example, credit card fraud; (v) some models are often lost due to storage or other reasons; (vi) some models may have been trained with a lot of data; (vii) it takes a long time to retrain the model, for example, a few months; and/or (viii) some models are often lost due to storage problems.

Some embodiments of the present invention recognize the following facts, potential problems and/or potential areas for improvement with respect to the current state of the art: (i) in cases such as credit card fraud, the results must be obtained within a specified time, possibly in milliseconds; (ii) an ensemble model from customers can have up to, or more than 2000 decision trees, (iii) the ensemble model usually takes a long time during the prediction phase, which does not meet customer expectations, especially for real-time scoring; and/or (iv) the performance of real-time scoring is critical in some cases. Some other possible use cases, or applications, of the prediction model technology described herein includes: forecast the trend of house price, forecast the future sales of supermarket, detect spam email, and forecast the revenue of a product.

A method according to an embodiment of the present invention includes the following operations (not necessarily in the following order): (i) instantiate the specific model as one record, based on the model scoring template, which will generate based on PMML; (ii) cluster all models into multiple groups; (iii) compute model contribution weights on each cluster; (iv) choose top models; (v) update the top models dynamically; (vi) generate native code fragment packages of different platforms based on user settings and special one record; (vii) deploy the native code fragment package to the specific real time scoring environment based on the platform and users settings; and (viii) restore specific models to products (for example, PMML, python, etc.) based on a specific record in the database.

Figure 4:
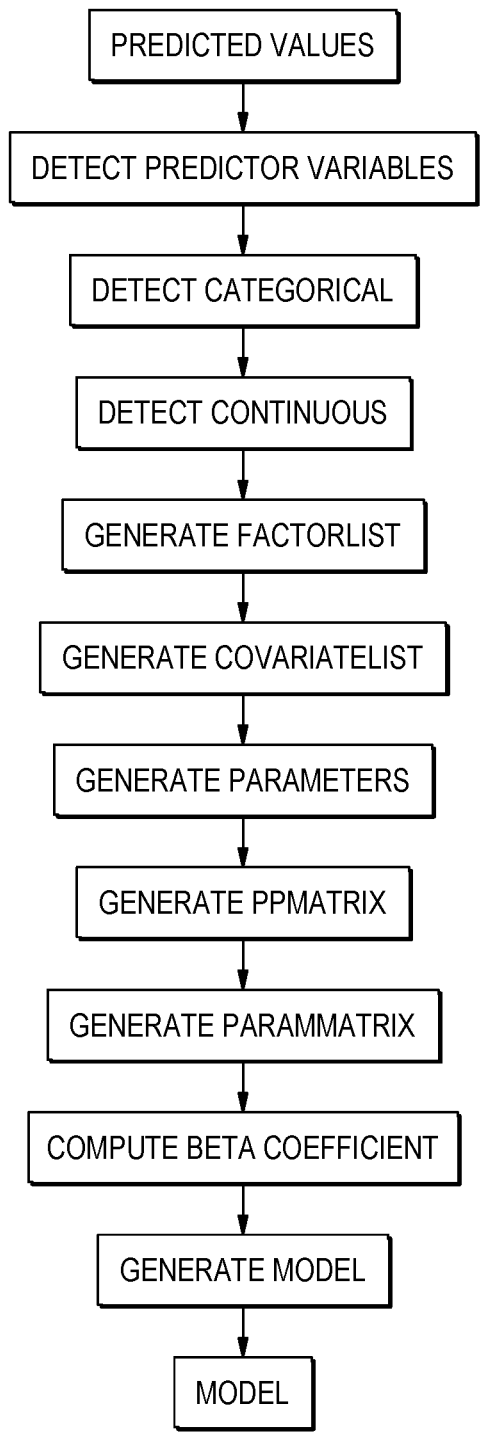
FIG. 4 is a flowchart showing a second embodiment method.

As shown in FIG. 4, flowchart 400 shows an embodiment of a method according to the present invention. Some embodiments of the present invention may include one, or more, of the following operations, features, characteristics and/or advantages: (i) improves the ensemble scoring performance; (ii) is easy to deploy to various user platforms; and/or (iii) is easy to restore the model quickly.

Some embodiments of the present invention may include one, or more, of the following operations, features, characteristics and/or advantages: (i) leverages base models, rather than data fields, to improve performance; (ii) improves scoring performance; (iii) can recover the lost model; and/or (iv) recovers models from targeted predicted values based on predictive model markup language (PMML) which enables the predicted values to be recovered with little data loss.

Some embodiments of the present invention may include one, or more, of the following operations, features, characteristics and/or advantages: (i) provides a method to recover the model from the predicted values; (ii) according to PMML standards, for some models, such as expression, recovery is simple and the values can be recovered with little data loss; and/or (iii) for some assembled models, some optimization methods are needed to obtain specific model values.

Some embodiments of the present invention may include one, or more, of the following operations, features, characteristics and/or advantages: (i) association analysis; (ii) detect the model type based on the target predicted value; (iii) detect the relationship of the predicted value and model coefficient based on variables; (iv) optimize the model coefficient; and/or (v) estimate the new model based on partial training data which is the hold out data.

Some embodiments of the present invention may include one, or more, of the following operations, features, characteristics and/or advantages: (i) clusters all models into multiple groups; (ii) computes model contribution weights on each cluster; (iii) chooses the top models; (iv) updates the top models dynamically; (v) uses top models to predict the label; and/or (vi) can greatly improve performance.

In some embodiments, the top models are refreshed intermittently at intervals that may be based, at least in part, on the user's choice. There may be a setting, for example, every ten (10) minutes—it depends on the actual business volume. In some embodiments, there is latency between: (i) contextual changes that cause a different ML model to become optimal for the current context; and (ii) the dynamic re-ranking that updates the list of top-ranked models. However, typically that latency will be too small to cause any issues. Generally, they are parallel between computing top model and real prediction, and the latency is not too big.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
    instantiating a first specific model, as one record, based on a model scoring template;
    clustering a plurality of models into a plurality of groups to obtain a plurality of clusters;
    for each given cluster of the plurality of clusters, computing a model contribution weight value for the given cluster;
    choosing a set of top model(s) from the plurality of models;
    updating the model(s) of the set of top model(s) dynamically;
    using predictive model markup language (PMML) to recover a plurality of targeted predicted values using predictive model markup language (PMML); and
    recovering the first specific model from a plurality of targeted predicted values.

2. The CIM of claim 1 wherein the instantiation of the first specific model uses personalized print markup language.

3. The CIM of claim 1 further comprising:
    generating a plurality of native code fragment packages respectively for different platforms based on user settings and the first specific model and its associated one record.

4. The CIM of claim 3 further comprising:
    deploys a first native code fragment package, of the plurality of native code fragment packages, to a specific real time scoring environment based on a platform setting and users settings.

5. The CIM of claim 4 further comprising:
    restoring specific models to products based on a specific record in the database.

6. A computer program product (CPP) comprising:
    a set of storage device(s); and
    computer code stored collectively in the set of storage device(s), with the computer code including data and instructions to cause a processor(s) set to perform at least the following operations:
        instantiating a first specific model, as one record, based on a model scoring template,
        clustering a plurality of models into a plurality of groups to obtain a plurality of clusters,
        for each given cluster of the plurality of clusters, computing a model contribution weight value for the given cluster,
        choosing a set of top model(s) from the plurality of models,
        updating the model(s) of the set of top model(s) dynamically,
        using predictive model markup language (PMML) to recover a plurality of targeted predicted values using predictive model markup language (PMML), and
        recovering the first specific model from a plurality of targeted predicted values.

7. The CPP of claim 6 wherein the instantiation of the first specific model uses personalized print markup language.

8. The CPP of claim 6 wherein the computer code further includes instructions for causing the processor(s) set to perform the following operation(s):
   generating a plurality of native code fragment packages respectively for different platforms based on user settings and the first specific model and its associated one record.

9. The CPP of claim 8 wherein the computer code further includes instructions for causing the processor(s) set to perform the following operation(s):
   deploys a first native code fragment package, of the plurality of native code fragment packages, to a specific real time scoring environment based on a platform setting and users settings.

10. The CPP of claim 9 wherein the computer code further includes instructions for causing the processor(s) set to perform the following operation(s):
    restoring specific models to products based on a specific record in the database.

11. A computer system (CS) comprising:
    a processor(s) set;
    a set of storage device(s); and
    computer code stored collectively in the set of storage device(s), with the computer code including data and instructions to cause the processor(s) set to perform at least the following operations:
        instantiating a first specific model, as one record, based on a model scoring template,
        clustering a plurality of models into a plurality of groups to obtain a plurality of clusters,
        for each given cluster of the plurality of clusters, computing a model contribution weight value for the given cluster,
        choosing a set of top model(s) from the plurality of models, and
        updating the model(s) of the set of top model(s) dynamically,
        using predictive model markup language (PMML) to recover a plurality of targeted predicted values using predictive model markup language (PMML), and
        recovering the first specific model from a plurality of targeted predicted values.

12. The CS of claim 11 wherein the instantiation of the first specific model uses personalized print markup language.

13. The CS of claim 11 wherein the computer code further includes instructions for causing the processor(s) set to perform the following operation(s):
    generating a plurality of native code fragment packages respectively for different platforms based on user settings and the first specific model and its associated one record.

14. The CS of claim 13 wherein the computer code further includes instructions for causing the processor(s) set to perform the following operation(s):
    deploys a first native code fragment package, of the plurality of native code fragment packages, to a specific real time scoring environment based on a platform setting and users settings.

15. The CS of claim 14 wherein the computer code further includes instructions for causing the processor(s) set to perform the following operation(s):
    restoring specific models to products based on a specific record in the database.

\* \* \* \* \*